United States Patent
Jiang (10) Patent No.: US 10,386,660 B2
(45) Date of Patent: Aug. 20, 2019

(54) OPTICAL PHASE SHIFTER, OPTICAL INTERFEROMETER BASED THEREUPON, AND METHOD OF MANUFACTURE THEREOF

(71) Applicant: Jia Jiang, Kanata (CA)

(72) Inventor: Jia Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/476,313

(22) Filed: Mar. 31, 2017

(65) Prior Publication Data

US 2018/0284493 A1    Oct. 4, 2018

(51) Int. Cl.
| | |
|---|---|
| *G02F 1/025* | (2006.01) |
| *G02F 1/225* | (2006.01) |
| *G02F 1/00* | (2006.01) |
| *G02F 1/015* | (2006.01) |
| *G02F 1/21* | (2006.01) |

(52) U.S. Cl.
CPC ............ *G02F 1/025* (2013.01); *G02F 1/2257* (2013.01); *G02F 1/009* (2013.01); *G02F 2001/0156* (2013.01); *G02F 2001/212* (2013.01); *G02F 2201/06* (2013.01)

(58) Field of Classification Search
None
See application file for complete search history.

(56) References Cited

U.S. PATENT DOCUMENTS

| | | |
|---|---|---|
| 6,704,487 B2 | 3/2004 | Parhami et al. |
| 2001/0016093 A1 | 8/2001 | Dawes et al. |
| 2003/0081876 A1 | 5/2003 | Beguin et al. |
| 2005/0089291 A1* | 4/2005 | Yamada ............... B82Y 20/00 385/129 |

(Continued)

FOREIGN PATENT DOCUMENTS

| | | |
|---|---|---|
| CN | 1423753 A | 6/2003 |
| CN | 102804033 A | 11/2012 |
| WO | 2016132747 A1 | 8/2016 |

OTHER PUBLICATIONS

Raghunathan et al. "Co-polymer Clad Design for High Performance Athermal Photonic Circuits", Optics Express vol. 20(19), Sep. 10, 2012.

(Continued)

*Primary Examiner* — Michelle R Connelly (57) ABSTRACT

A phase shifting optical device and method of manufacture is provided. In an embodiment, the phase shifting optical device may include a first arm defining a first arm optical path, a second arm defining a second arm optical path, a beam splitter for splitting an input optical beam into first and second sub-beams for propagating in the first and second arm optical paths, respectively, and a beam combiner for combining the first and second sub-beams propagated in the first and second arm optical paths, respectively, into an output optical beam. The first arm including a carrier modification element to induce a phase shift in the first arm optical path relative to the second arm optical path. A cladding may be provided proximate to the first arm, the cladding having a temperature coefficient of refractive index (dn/dT)cl opposite in sign to a temperature coefficient of refractive index (dn/dT)a of the first arm.

17 Claims, 10 Drawing Sheets

(56) References Cited

U.S. PATENT DOCUMENTS

| | | | |
|---|---|---|---|
| 2011/0194803 A1* | 8/2011 | Shin | G02F 1/2257 |
| | | | 385/3 |
| 2012/0057815 A1 | 3/2012 | Ezaki et al. | |
| 2012/0243828 A1* | 9/2012 | Suzuki | G02B 6/12007 |
| | | | 385/32 |
| 2013/0011093 A1 | 1/2013 | Goh et al. | |
| 2016/0246157 A1* | 8/2016 | Dumais | G02F 1/2257 |
| 2016/0299292 A1* | 10/2016 | Hassan | G02B 6/1347 |
| 2018/0034555 A1 | 2/2018 | Goh et al. | |

OTHER PUBLICATIONS

Kokubum et al., "Temperature-Independent Optical Filter at 1.55 um Wavelength Using a Silica-Based Athermal Waveguide", Electronic Letters, vol. 34(4), 367-369, Feb. 19, 1998.

Ibrahim et al., "Athermal Silicon Waveguides with Bridged Subwavelength Gratings for TE and TM Polarizations," Optics Express, vol. 20(16), 18356-18361, Jul. 30, 2012.

Teng et al., "Athermal silicon-on-insulator Ring Resonators by Overlay a Polymer Cladding on Narrowed Waveguide", Optics Express, vol. 17(17), 14627-14633, Aug. 17, 2009.

Zhou et al., "Performance Influence of Carrier Absorption to the Mach-Zehnder-interference Based Silicon Optical Switch", Opt. Exp. vol. 17(9), 7043-7051, Apr. 27, 2009.

* cited by examiner

Cross-section view

FIG. 5A

Cross-section view

FIG. 5B

Cross-section view

Extinction ratio (dual drive) changes with phase error

FIG. 8C

Deterioration of the ER (dual drive) vs phase error

FIG. 8D

OPTICAL PHASE SHIFTER, OPTICAL INTERFEROMETER BASED THEREUPON, AND METHOD OF MANUFACTURE THEREOF

FIELD

The present application pertains to the field of optical devices and in particular to optical devices which employ phase shifting.

BACKGROUND

Optical devices such as optical switches based on the free-carrier effect are widely used in data communications and processing. In particular, optical switches have a number of advantages over electrical switches, including switching speed, power consumption, and stability. There is also a wider range of opportunities to integrate multiple functions into an optical switch assembly, as compared with microelectromechanical (MEMS) switches, for example. Interferometer-based optical switches use optical phase shifters to achieve the required switching function.

Typically, optical devices such as optical switches and modulators are built on various platforms such as silica-on-silicon, AlGaAs/GaAs, InP, and others known in the art. Silicon-on-Insulator (SOI) platform is often seen as advantageous as it allows for a compact form factor based on the large refractive index contrast inherent in that platform.

A problem that arises with carrier-effect based optical phase shifting based devices is that a temperature difference ($\Delta T$) may be induced in different parts of the device, as a result of self-heating due to driving part of the optical device with an electrical voltage. As a result of self-heating in the driven part, and no heating in parts of the optical device which are not driven, a $\Delta T$ results, causing the phase shift to deviate from the value that was optimized during device design. For example, in Mach-Zehnder interferometer-based optical switches using this type of phase shifter, self-heating can cause a temperature difference which induces an unexpected phase shift (namely phase error) between the second arm and the first arm of the device during the switching operation. This phase error causes a deterioration in the switch output contrast ratio.

The $\Delta T$ is problematic as the temperature coefficient of refractive index (dn/dT) for each of the arms of an optical device is typically greater than zero for an inorganic material such as silicon and silicon dioxide. As a result, a $\Delta T$ between the second arm and the first arm results in a difference in the refractive index of the first arm relative to the second arm proportionate to $\Delta T$ and dn/dT.

A difference in the refractive index induced by self-heating between the first arm and the second arm results in a time-varying extra phase shift from the desired phase shift between the two arms, which may increase the cross talk of an optical switch or induce an error in a phase shifter. As a result, carrier effect based optical devices are commonly prone to optical phase drift, which arises from self-heating of the first arm of the optical device during operation. An external compensation circuit could be used as a solution to compensate the phase drift caused by self-heating. However, this complicates the required control circuit, which has to take into account the time dynamics of self-heating.

Therefore, there is a need for an optical device that is resistant to driving current induced crosstalk, and other limitations of the prior art.

This background information is provided to reveal information believed by the applicant to be of possible relevance to the present application. No admission is necessarily intended, nor should be construed, that any of the preceding information constitutes prior art against the present application.

SUMMARY

In an embodiment, an optical phase shifter may be provided. The optical phase shifter may include an optical waveguide core and a carrier modification element to induce a phase shift in the optical waveguide core. A cladding is disposed proximate to the optical waveguide core, the cladding having a temperature coefficient of refractive index $(dn/dT)_{cl}$ opposite in sign to a temperature coefficient of refractive index $(dn/dT)_a$ of the optical waveguide core.

In an embodiment, an optical interferometer is provided. The optical interferometer may include: a first arm defining a first arm optical path; a second arm defining a second arm optical path; a beam splitter for splitting an input optical beam into first and second sub-beams for propagating in the first and second arm optical paths, respectively; a beam combiner for combining the first and second sub-beams propagated in the first and second arm optical paths, respectively, into an output optical beam; the first arm including a carrier modification element to induce a phase shift in the first arm optical path relative to the second arm optical path; and, a cladding proximate to the first arm, the cladding having a temperature coefficient of refractive index $(dn/dT)_{cl}$ opposite in sign to a temperature coefficient of refractive index $(dn/dT)_a$ of the first arm.

In an embodiment, a method of manufacturing an optical interferometer is provided. The method may include: defining a silicon structure on a substrate; providing a p-type region and an n-type region on opposing sides of the silicon structure; and, depositing a cladding proximate to the silicon structure, the cladding having a cladding temperature coefficient of refractive index $(dn/dT)_{cl}$ opposite in sign to the silicon structure. In some implementations, an effective temperature coefficient of refractive index $(dn/dT)_e$ of a waveguide structure formed by the silicon structure and the cladding is less than an effective temperature coefficient of refractive index $(dn/dT)_e$ of a waveguide structure formed by the silicon structure alone. In some implementations, an effective temperature coefficient of refractive index $(dn/dT)_e$ of a waveguide structure formed by the silicon structure and the cladding is about zero.

BRIEF DESCRIPTION OF THE FIGURES

Further features and advantages will become apparent from the following detailed description, taken in combination with the appended drawings, in which.

It will be noted that throughout the appended drawings, like features are identified by like reference numerals.

DETAILED DESCRIPTION

In an embodiment, an optical phase shifter is provided. The optical phase shifter can reduce sensitivity of the effective index of refraction of the structure to temperature. In an implementation, an optical interferometer is provided, the optical interferometer including at least one such optical phase shifter. In an implementation, an optical switch or a modulator is provided including at least one such optical interferometer.

In an embodiment, the optical interferometer has a first arm defining a first arm optical path and a second arm defining a second arm optical path. A beam splitter is provided for splitting an input optical beam into first and second sub-beams for propagating in the first arm optical path and the second arm optical path, respectively. A beam combiner is provided for combining the first and second sub-beams propagated in the first and second arm optical paths, respectively, into an output optical beam. The first arm includes a carrier modification element to induce a phase shift in the first arm optical path relative to the second arm optical path. The optical interferometer further includes a cladding proximate to the first arm. The cladding has a cladding temperature coefficient of refractive index $(dn/dT)_{cl}$ opposite in sign to a temperature coefficient of refractive index $(dn/dT)_a$ of the first arm. A cladding having an opposite in sign $(dn/dT)_{cl}$ cladding reduces the performance deterioration (i.e. extinction ratio deterioration) of the optical device caused by temperature changes between the first arm and the second arm that are a result of driving the optical device.

In an implementation, the first arm comprises a waveguide core and the carrier modification element comprises a p-n junction, or a p-i-n junction. The cladding may be disposed proximate to at least one surface of the waveguide core. In an implementation, the first arm comprises a combination of a waveguide core supported by a silicon insulating substrate and the carrier modification element, and the cladding may be disposed around at least a portion of the waveguide core.

In an implementation, the first arm comprises a semiconductor junction, such as p-n, or a p-i-n, junction, and the cladding is proximate to at least a portion of the p-n, or p-i-n, junction as the case may be.

In an implementation, the cladding is made of a non-semiconductor material. In an implementation, the cladding is a polymer.

In an implementation, the carrier modification element comprises a carrier injection element. In an implementation, the carrier injection element comprises a p-i-n junction. In an implementation, the carrier modification element comprises a carrier depletion element. In an implementation, the carrier depletion element comprises a p-n junction.

In an implementation, due to the combination of the cladding and the first arm, the optical device is less sensitive to temperature differences between the first arm and the second arm than an optical device without the cladding. In the implementation, an absolute value of an effective temperature coefficient of refractive index $(dn/dT)_e$ for the combination of the cladding and the first arm is less than an absolute value of a first arm temperature coefficient of refractive index $(dn/dT)_a$.

In an implementation, due to the combination of the cladding and the first arm, the optical device is relatively insensitive to temperature differences between the first arm and the second arm. In the implementation, an effective temperature coefficient of refractive index $(dn/dT)_e$ for the combination of the cladding and the first arm is about zero.

In an implementation, the cladding is proximate to the first arm and the second arm. In the implementation, an effective temperature coefficient of refractive index $(dn/dT)_e$ for the combination of the cladding and the first arm is about zero and an effective temperature coefficient of refractive index $(dn/dT)_e$ for the combination of the cladding and the second arm is about zero. In the implementation, the refractive index for each of the first arm and the second arm in combination with the cladding is insensitive to temperature.

In an implementation, an optical device is provided including the above optical interferometer. In an implementation, the optical device is a modulator. In an implementation, the optical device is an optical switch.

Figure 1:
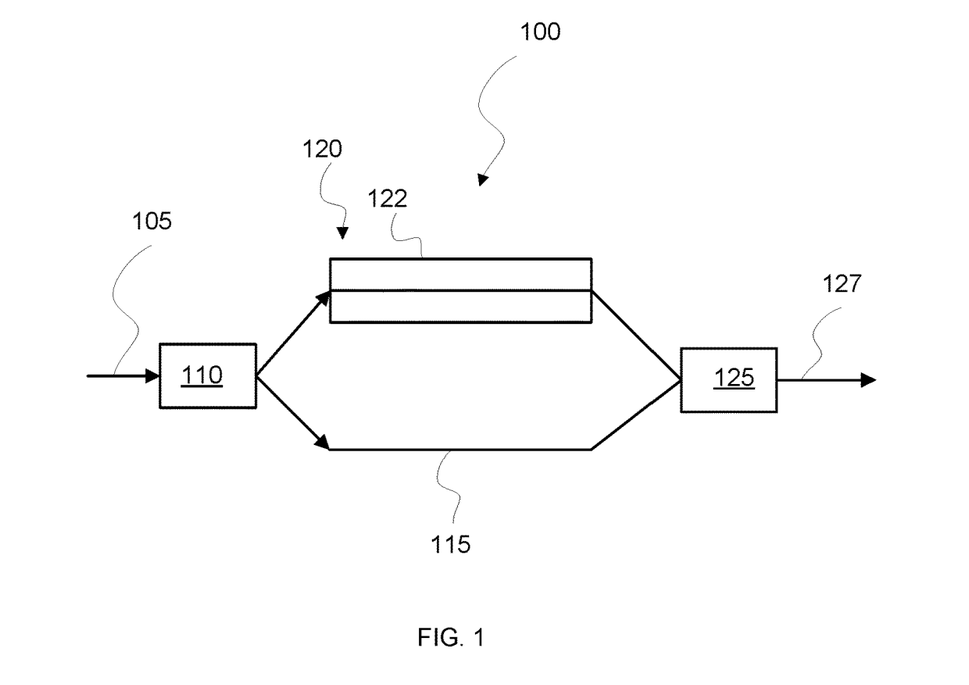
FIG. 1 illustrates an embodiment of a Mach-Zehnder interferometer.

Referring to FIG. 1, an embodiment of an optical interferometer 100 is illustrated. In this example, the optical interferometer 100 includes a beam splitter 110 that receives an optical beam from a source 105. The beam splitter 110 splits an input optical beam into first and second sub-beams for propagating in the first and second arm optical paths: a first arm optical path through a first arm 120; and a second arm optical path through a second arm 115. The first arm 120 including a carrier modification element 122. After passing through the two optical paths, a beam combiner 125 combines combining the first and second sub-beams propagated in the first and second arm optical paths into a single combined output optical beam at the output 127 from the optical device 100.

Operation of the optical interferometer 100 will now be considered. In general, the carrier modification element may be operative as a carrier injection element to inject carriers into the first arm 120. Alternatively, the carrier modification element may be operative as a carrier depletion element to deplete carriers from the first arm 130. In both cases activation of the first arm 120 will induce a phase shift in the first arm optical beam relative to the second arm optical beam. For example, the first arm 120 may be operative to selectively phase shift the first arm beam to an inverse phase from the second arm beam to produce a null output beam at the output 127 as the second arm beam and the first arm beam cancel in phase due to destructive optical interference.

In general, with these types of optical interferometers 100, successful operation relies upon a predictable and stable difference in phase between the first arm 120 and the second arm 115. A problem that has been identified with optical interferometers 100, is that the carrier modification element 122 imparts a heating effect on the first arm 120, raising its temperature relative to the second arm 115. This difference in temperature between the first arm 120 and the second arm 115 affects the relative optical properties of the first arm 120 and the second arm 115. In particular, the refractive index of the silicon based optical devices typically varies with temperature.

The temperature coefficient of refractive index (dn/dT) provides a measure of how an optical structure's refractive index changes based on temperature. Each component of the optical structure, the silicon substrate, substrate $SiO_2$ insulator, etc. has its own temperature coefficient of refractive index (dn/dT). The effective temperature coefficient of refractive index $(dn/dT)_e$ of an optical structure as a whole results from the combined effect of the temperature coefficient of refractive index (dn/dT) for each of the components of the optical structure. Generally for conventional silicon-based optical devices the effective temperature coefficient of refractive index $(dn/dT)_e$ is non-zero since both silicon's temperature coefficient of refractive index $(dn/dT)_{Si} \sim 2 \times 10^{-4}$ and common insulators, such as the example of $SiO_2$ with a temperature coefficient of refractive index $(dn/dT)_{SiO2} \sim 1 \times 10^{-5}$, are positive values and as a result are additive.

When the value of the effective temperature coefficient of refractive index $(dn/dT)_e$ are non-zero, silicon-based optical devices are thermally sensitive. With a change in temperature, the effective index of refraction changes and, as a result, a relative phase shift will be introduced. In the case of optical devices with temperature differences between their second arm 115 and first arm 120, the phase shift will lead to a phase error when the first arm optical beam and second arm optical beam are combined.

Figure 2:
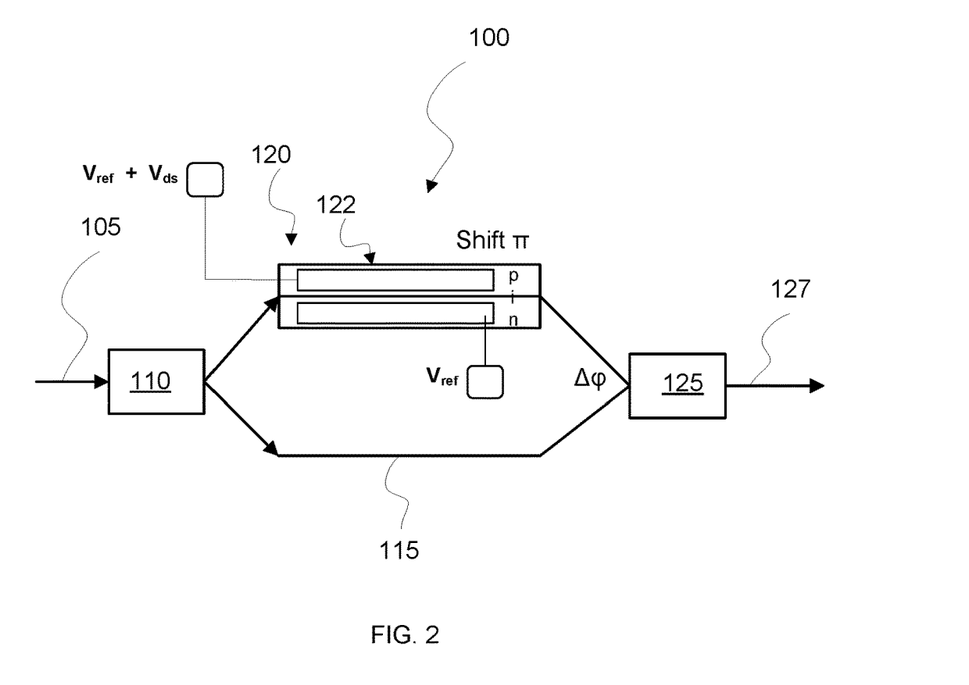
FIG. 2 illustrates an embodiment of a Mach-Zehnder interferometer with a carrier injection induced phase shifter.

Referring to FIG. 2, an embodiment of an optical interferometer 200 is presented. In the example of FIG. 2, the carrier modification element 122 comprises a carrier injection element and the first arm 120 comprises a p-i-n junction. As illustrated, a driving voltage $V_{ds}$ applied to the p-i-n junction injects carriers, leading to a phase shift $\Delta \varphi$ in the first arm optical beam. When the first arm optical beam and the second arm optical beam are combined in the beam combiner 125, the phase difference between the first arm optical beam and the second arm optical beam creates an effect on the output 127 relative to the input 105.

In another example, not illustrated, the carrier modification element 122 comprises a carrier depletion element and the first arm 120 comprises a p-n junction. In this example, a driving voltage $V_{ds}$ applied to the p-n junction depletes carriers, leading to a phase shift $\Delta \theta$ in the first arm optical beam.

In some implementations, the optical interferometer 200 may function as a modulator, where an input 105 is modulated by operation of the carrier modification element 122, where a phase difference is created by operation of the carrier modification element 122 based upon a measurement signal being applied as the driving voltage $V_{ds}$. In some implementations, the optical device 200 may act as an optical switch, where an output 127 is switched on or off by selective activation of the carrier modification element 122.

Embodiments of the present invention are applicable to a variety of optical devices where there may be temperature differences between two or more parts of the optical device leading to a difference in the index of refraction between those parts. By way of example, the optical device could form a part of a 2×2 optical structure, such as a 2×2 modulator or 2×2 switch. The illustrations in the present application show a structure with a single first arm and a single second arm for simplicity, but the invention may be extended to cover multiple first arms and second arms, and multiple phase shifters, as may be required.

In all of these examples, activation of the carrier modification element heats the first arm 120 creating a temperature difference between the first arm 120 and the second arm 115. The optical interferometer 200 of FIG. 2, however, has lower sensitivity to temperature differences between the first arm 120 and the second arm 115, and accordingly there will be little to no difference in the index of refraction of each of the first arm 120 and the second arm 115. In an embodiment, the optical interferometer 200 has an effective temperature coefficient of refractive index $(dn/dT)_e$ that is close to zero, e.g. less than $10^{-4}$. In an ideal case, the effective temperature coefficient of refractive index $(dn/dT)_e$ is zero. In this case, self-heating of the first arm 120 does not lead to a change in the refractive index for the first arm 120. Practically speaking, a real world optical interferometer 200 may have an effective temperature coefficient of refractive index $(dn/dT)_e$ that, while non-zero, is smaller than what it would normally otherwise be for a conventional optical device. In such case, the thermal sensitivity of the optical interferometer 200 will be less than that of a conventional optical interferometer. Depending upon the degree of thermal sensitivity, the optical interferometer 200 will have minimal change in the refractive index of the first arm 120 over expected temperature differences caused by activation of the carrier modification element 122.

Figure 3A:
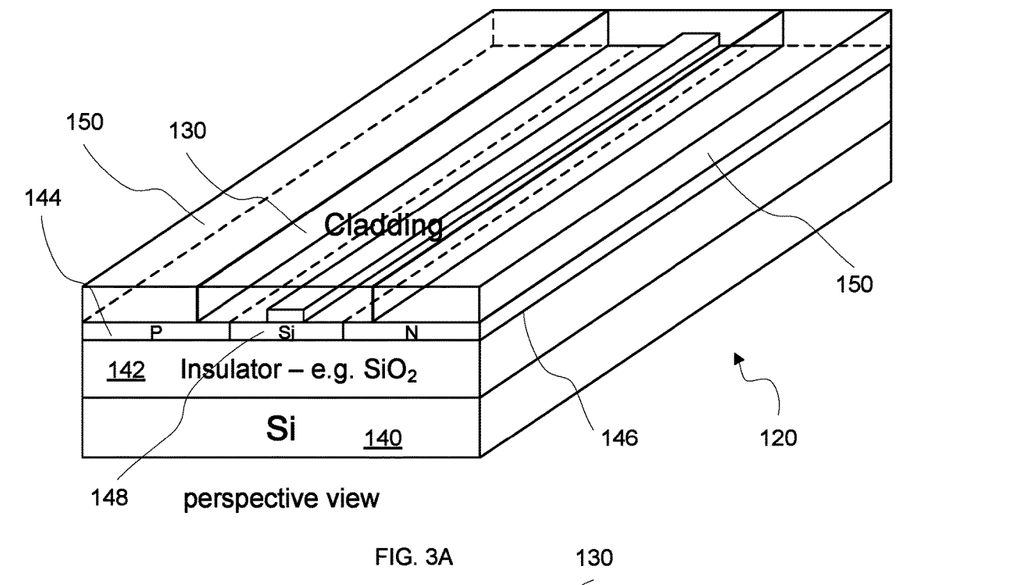
FIGS. 3A and 3B illustrate embodiments of an isometric perspective cross-section view and a cross-section view of a phase shifting optical device in the Mach-Zehnder interferometer of FIGS. 1 and 2.
Figure 3B:
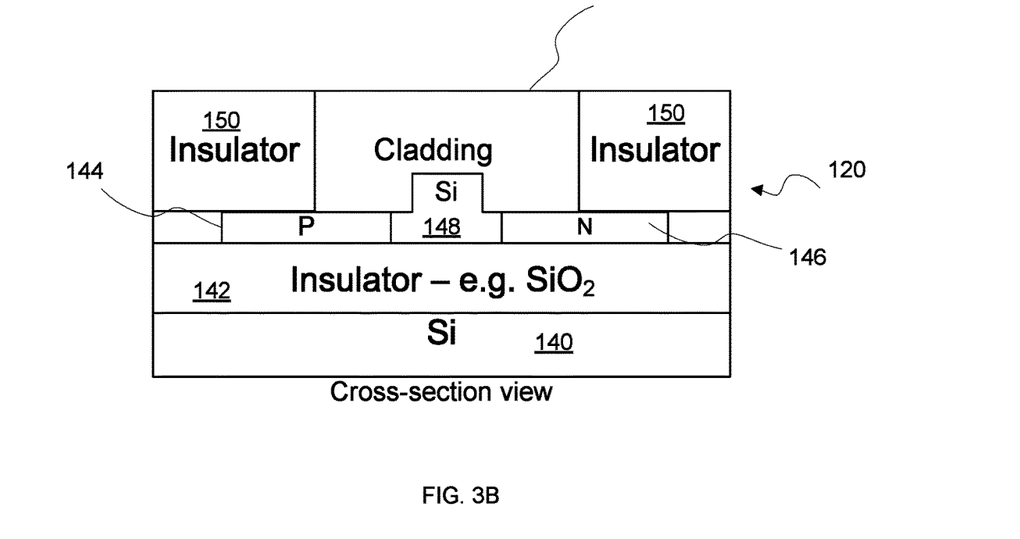

Referring to FIGS. 3A and 3B, an isometric perspective cross-section drawing and a cross-section drawing of an optical phase shifter 300 in the first arm 120 of the optical interferometer 200 of FIG. 2 are presented. In the example of FIGS. 3A and 3B, the optical phase shifter 300 includes an optical waveguide core 148 and a carrier modification element including a p-doped region 144 and an n-doped region 146. A cladding 130 is disposed proximate to the optical waveguide core 148. The cladding 130 has a temperature coefficient of refractive index $(dn/dT)_{cl}$ opposite in sign to a temperature coefficient of refractive index $(dn/dT)_a$ of the optical waveguide core 148. The whole structure rests on an insulating layer 142 such as $SiO_2$ on a silicon substrate 140. The silicon substrate 140 and the insulating layer 142 may be referred collectively as a substrate. The p-doped region 144, the waveguide core 148, and the n-doped region 146 form a p-i-n junction, which may function as a carrier injection element. Other carrier modification elements 122 are contemplated, including carrier depletion elements e.g. based on a p-n junction. A second, insulator cladding 150 disposed over p-doped region 144 and the n-doped region 146 may also be provided in some implementations.

The doped regions could be, for instance, a phosphorous-doped region for the n-type region 146 and a p-type boron-doped region for the p-doped region 144. These are, however, only examples and not intended to be limiting. Connections and contacts to apply a driving voltage $V_{ds}$ to the doped regions 144 and 146 to activate the carrier injection element are not included in this illustration.

Figure 3C:
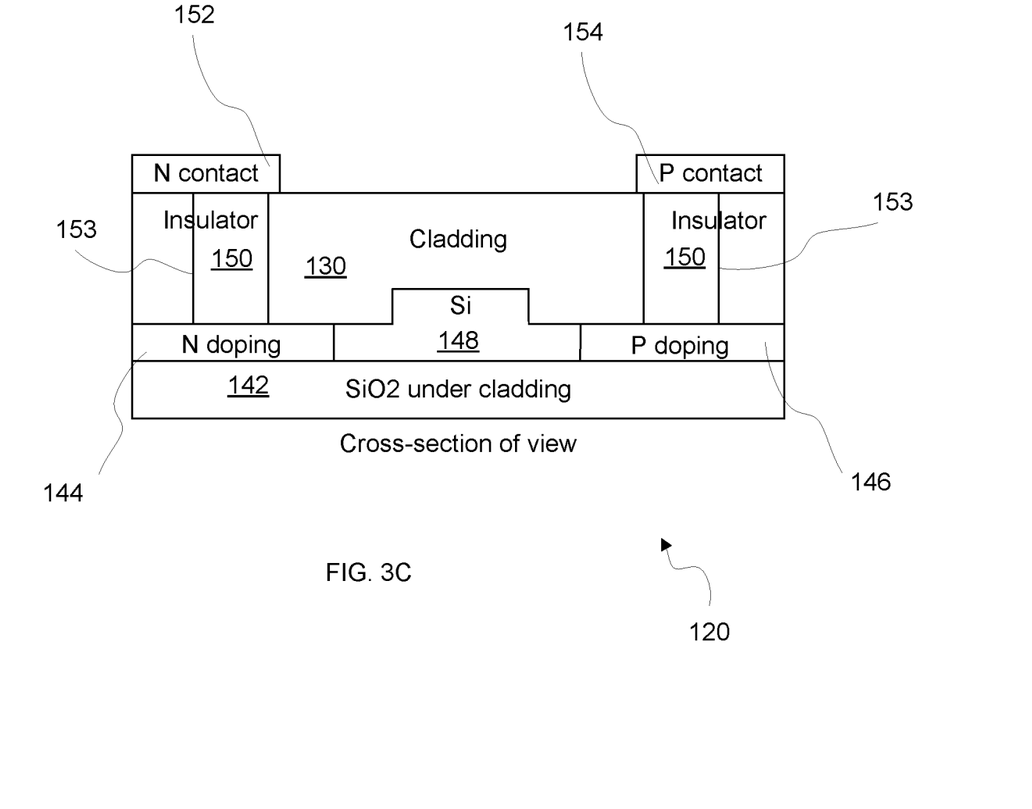
FIG. 3C illustrates a cross-section view of the first arm of FIGS. 3A and 3B.

FIG. 3C is a cross-section view of the first arm 120 of FIGS. 3A and 3B including the N contact 152, P contact 154, and vias 153, for applying electrical current to the n-doped region 144 and p-doped region 146.

Figures 4A, 4B:
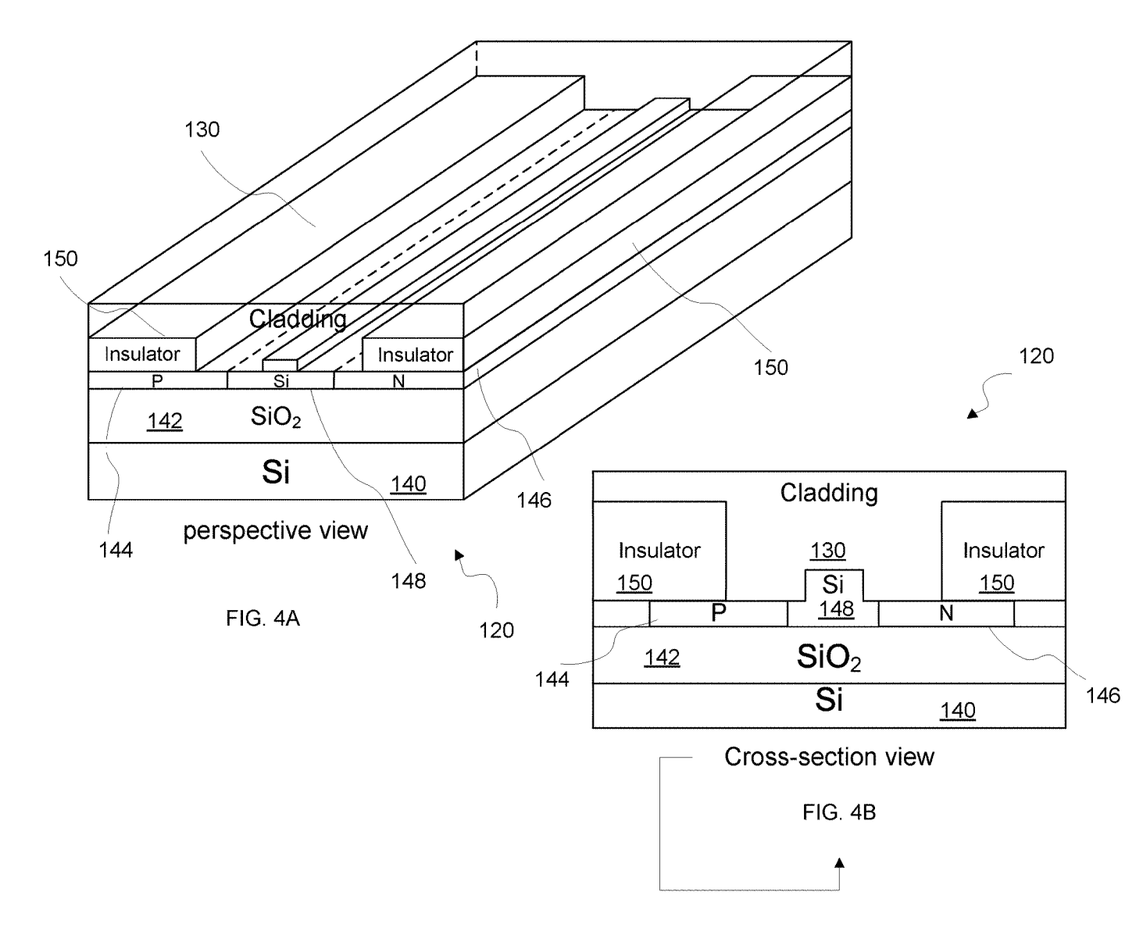
FIGS. 4A and 4B illustrate embodiments of an isometric perspective cross-section view and a cross-section view of an embodiment of an optical phase shifter.

Referring to FIGS. 4A and 4B, an isometric perspective cross-section drawing and a cross-section drawing of an embodiment of the optical phase shifter 300 are presented. In this embodiment, the cladding 130 extends over the insulator cladding 150, in addition to the silicon waveguide core 148 and the doped regions 144, 146.

In a conventional optical phase shifter, the insulator cladding 150 extends over the entirety of the doped regions 144, 146 and the silicon waveguide core 148. An effective temperature coefficient of refractive index $(dn/dT)_e$ for such a first arm 120 would be a non-zero positive value, based on the combination of silicon's temperature coefficient of refractive index $(dn/dT)_{Si}$ and the insulator's, such as $SiO_2$, temperature coefficient of refractive index $(dn/dT)_{SiO2}$.

Unlike the conventional optical device, the present optical phase shifter 300 of FIGS. 3A, 3B, and 3C includes the separate cladding 130 that is proximate to at least a portion of the silicon waveguide 146. In these examples, the cladding 130 is proximate to a top surface of the silicon waveguide core 148 and portions of the top surfaces of the doped regions 144, 146. In some implementations, the cladding 130 may be proximate to the silicon waveguide core 148, but separated from the silicon waveguide core 148 by a portion of the insulator 150.

The cladding 130 may be selected to have a cladding temperature coefficient of refractive index $(dn/dT)_{cl}$ opposite in sign to a first arm temperature coefficient of refractive index $(dn/dT)_a$ of the other structures of the phase shifter 300 in the first arm 120. Preferably the cladding temperature coefficient of refractive index $(dn/dT)_{cl}$ is both opposite in sign and sized to reduce an effective temperature coefficient of refractive index $(dn/dT)_e$ for the first arm 120 such that an absolute value of the effective temperature coefficient of refractive index $(dn/dT)_e$ is less than the first arm temperature coefficient of refractive index $(dn/dT)_a$ of the remaining structures of the first arm 120 without the cladding 130. More preferably, the cladding temperature coefficient of refractive index $(dn/dT)_{cl}$ is both opposite in sign and sized to reduce an effective temperature coefficient of refractive index $(dn/dT)_e$ for the first arm 120 to about zero.

Determination of an effective temperature coefficient of refractive index (dn/dT) for a given structure may be determined through numerical techniques known in the art that model the effect of combining multiple structures of differing temperature coefficient of refractive index (dn/dT). Employing the techniques, a specific material may be selected for the cladding 130 to produce a desired effective temperature coefficient of refractive index $(dn/dT)_e$ for a given structure.

In some implementations, the cladding 130 may be a polymer cladding. In some implementations, the polymer may be silicone (i.e. a polysiloxane) based. Other cladding materials are contemplated, provided they are compatible with the materials and manufacturing processes of the optical device, and provide the required magnitude of cladding temperature coefficient of refractive index $(dn/dT)_{cl}$ opposite in sign from the first arm temperature coefficient of refractive index $(dn/dT)_a$ of the remaining structures of the first arm 120.

Figure 5A:
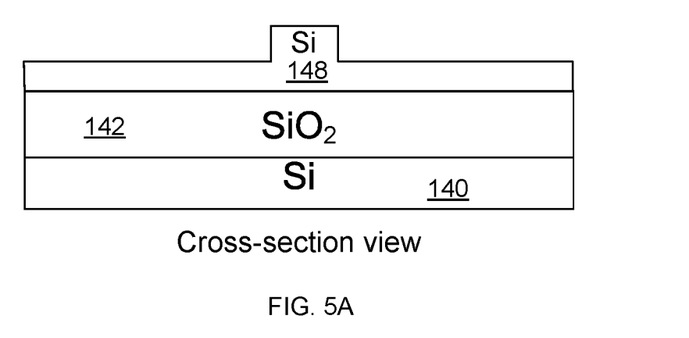
FIGS. 5A-5E illustrate embodiments of a manufacturing process for an optical interferometer including a phase shifting optical device.
Figure 5B:
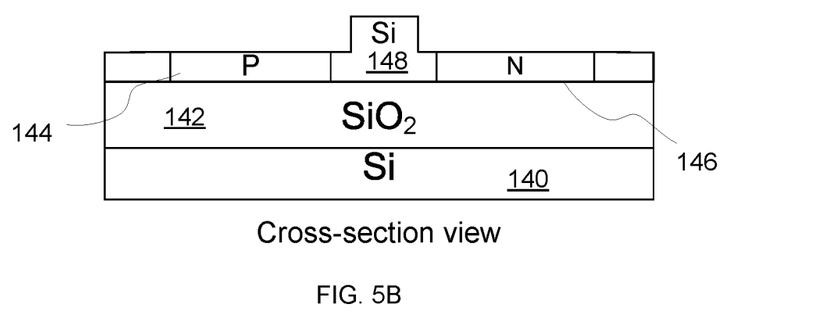
Figure 5C:
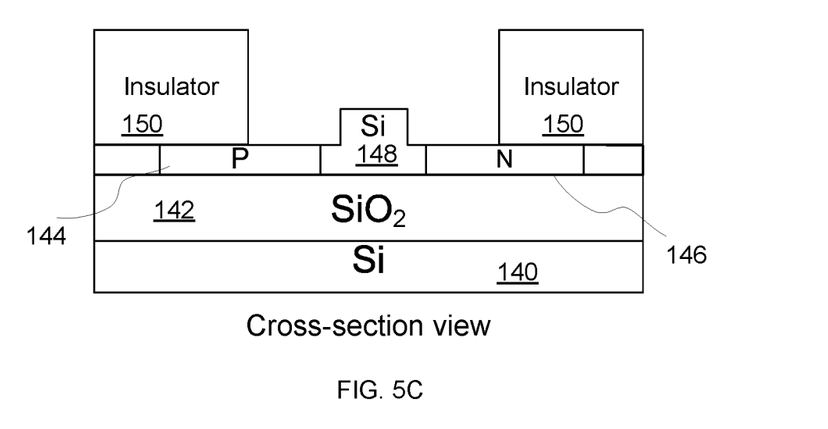
Figure 5D:
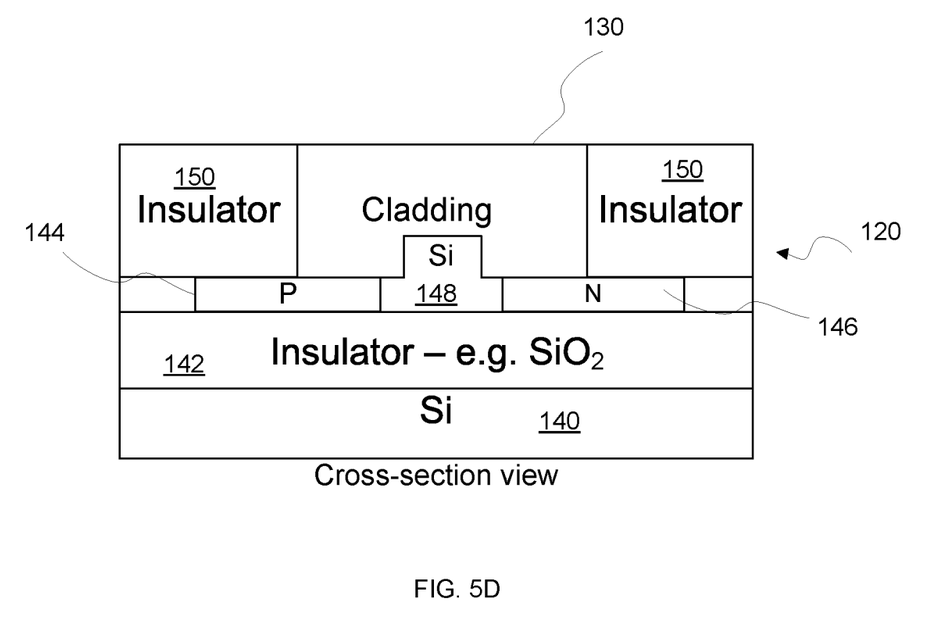
Figure 5E:
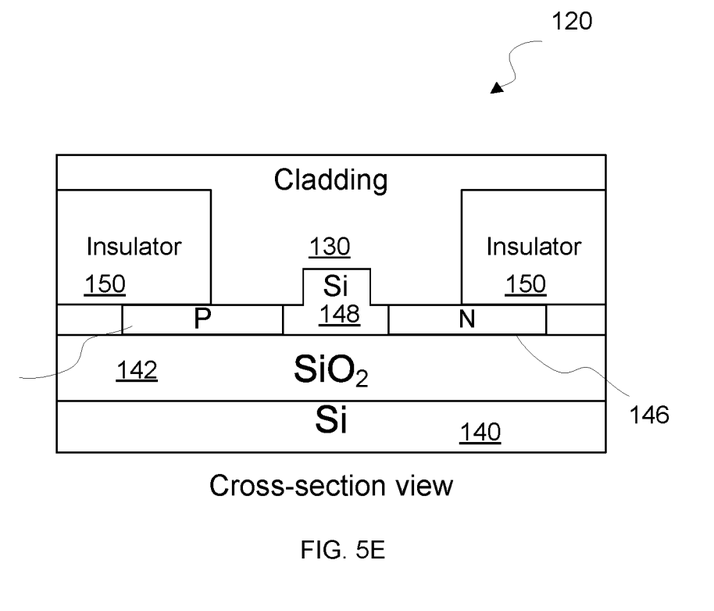

FIGS. 5A-5D illustrate embodiments of an example manufacturing process to manufacture the optical phase shifter 300 of the optical interferometer 200 of FIG. 2. Referring to FIG. 5A, in a first step a silicon structure, such as the waveguide core 148, is defined onto a substrate such as insulator support layer 142 illustrated in FIG. 5A. In this example the insulator is $SiO_2$. The insulating substrate 142 is typically supported by a silicon substrate 140. Referring to FIG. 5B, in a second step, the implants of P or N are doped into two silicon slab parts to provide the p-doped region 144 and the n-doped region 146. In an embodiment, referring to FIG. 5C, in a third step an insulator cladding 150 is deposited on at least a portion of the doped regions 144 146, leaving the silicon waveguide core 148 exposed. In an alternate embodiment, in a first part an insulator cladding 150 may be deposited across all of the doped regions 144 146 and silicon waveguide core 148, and in a second part a portion of the insulator cladding 150 may be removed down to a location proximate to the silicon waveguide core 148. Referring to FIG. 5D, in a third step the cladding 130 is deposited proximate to the silicon waveguide. In some embodiments, the cladding 130 may be deposited onto the exposed portion of the silicon waveguide core 148. In the embodiment of FIG. 5D, the cladding 130 is deposited onto the top surface of the silicon waveguide core 148. In some implementations, as illustrated in FIG. 5E, there may be a layer of insulator cladding 150 between some or all of the cladding 130 and the silicon waveguide core 148. The layer of insulator cladding 150 may be the product of the insulator cladding deposition, or may be the product of removing insulator cladding 150 after the insulator cladding deposition step. In some embodiments, after deposition of the cladding 130, an effective temperature coefficient of refractive index $(dn/dT)e$ of a waveguide structure formed by the silicon structure and the cladding is about zero. In some embodiments, after deposition of the cladding 130, an effective temperature coefficient of refractive index $(dn/dT)e$ of a waveguide structure formed by the silicon structure and the cladding is smaller than the effective temperature coefficient of refractive index $(dn/dT)e$ of a waveguide structure formed by the silicon structure alone.

Figure 6A:
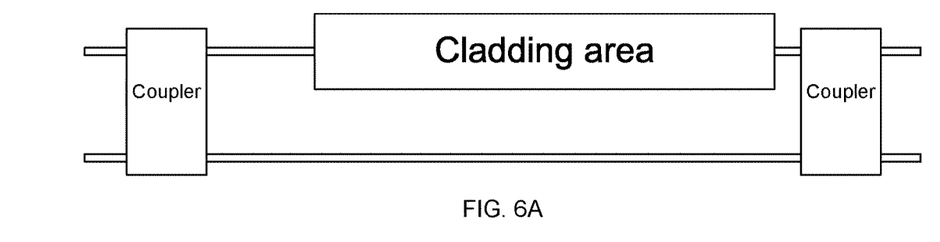
FIGS. 6A, 6B, 6C illustrate alternative embodiments of an optical interferometer showing different cladding deposition options.
Figure 6B:
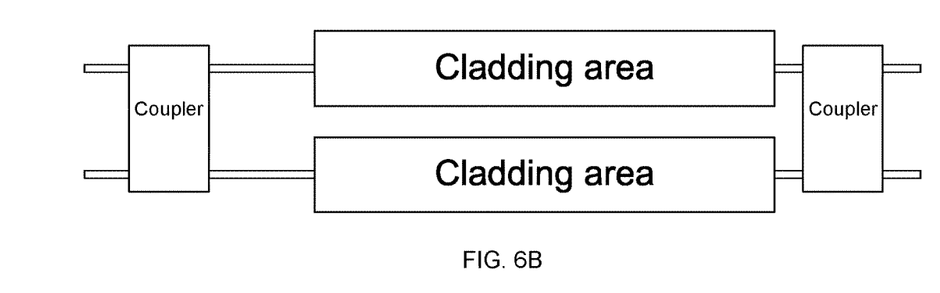
Figure 6C:
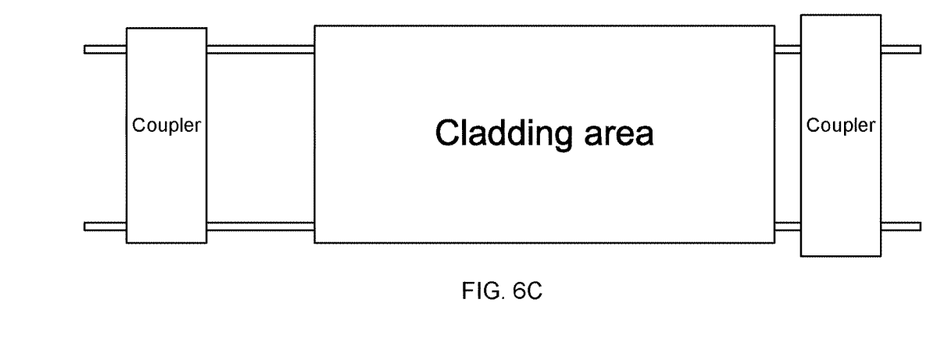

FIGS. 6A, 6B, 6C illustrate alternative locations for the cladding 130. In FIG. 6A, the cladding 130 is deposited over the first arm 120 only. In FIG. 6B, the cladding 130 is separately deposited onto each of the first arm 120 and the second arm 115. In FIG. 6C, the cladding 130 is deposited onto the first arm 120 and the second arm 115 collectively as a single monolithic structure.

Figure 7:
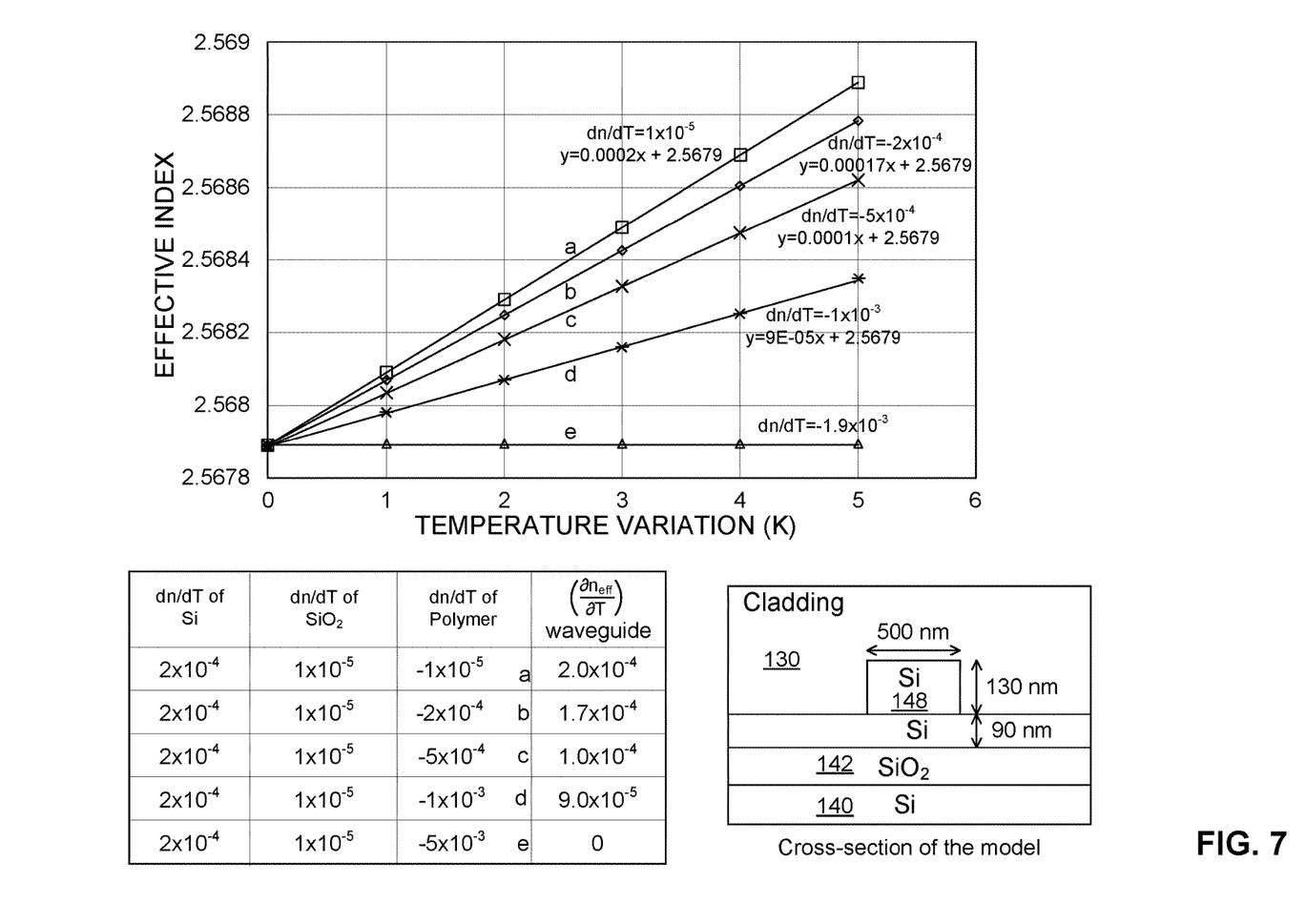
FIG. 7 illustrates modeling results for an embodiment of an optical phase shifter.

FIG. 7 illustrates experimental model results for an example model of a first arm illustrated in cross-section. In this example five numerical simulations were run using claddings with differing cladding temperature coefficient of refractive index $(dn/dT)_{cl}$ ($dn/dT_a=-1\times10^{-5}$, $dn/dT_b=-2\times10^{-4}$, $dn/dT_c=-5\times10^{-4}$, $dn/dT_d=-1\times10^{-3}$, $dn/dT_e=-5\times10^{-3}$). As illustrated, when the claddings are each combined with the remaining structures of the modeled first arm, the effective temperature coefficient of refractive index effective temperature coefficient of refractive index $(dn/dT)_e$ varies based on the value of the cladding temperature coefficient of refractive index $(dn/dT)_{cl}$. As illustrated, for this model, in case e with a cladding temperature coefficient of refractive index $(dn/dT)_{cl}=-5\times10^{-3}$, the effective temperature coefficient of refractive index $(dn/dT)_e$ for the combination of cladding 130 and the remaining structures of the modeled first arm is calculated to be zero.

Figure 8A:
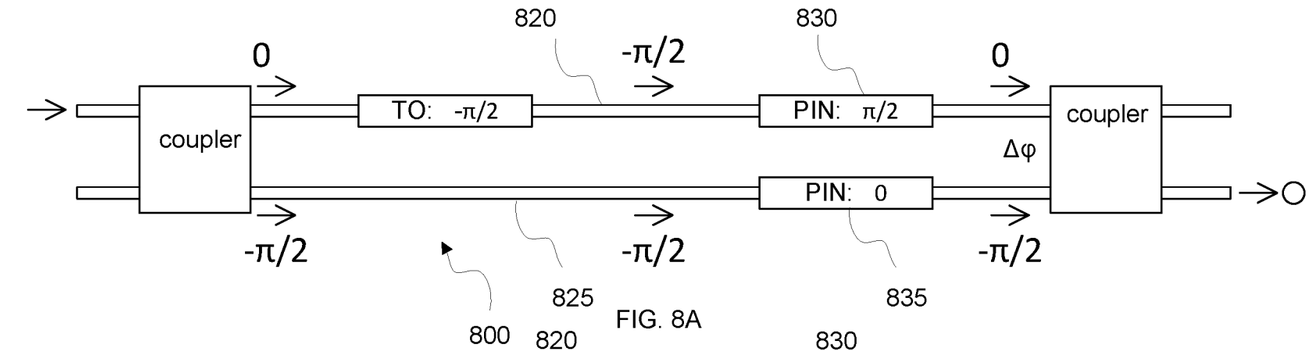
FIGS. 8A and 8B illustrate an example of a dual driven Mach-Zehnder 2×2 switch.
Figure 8B:
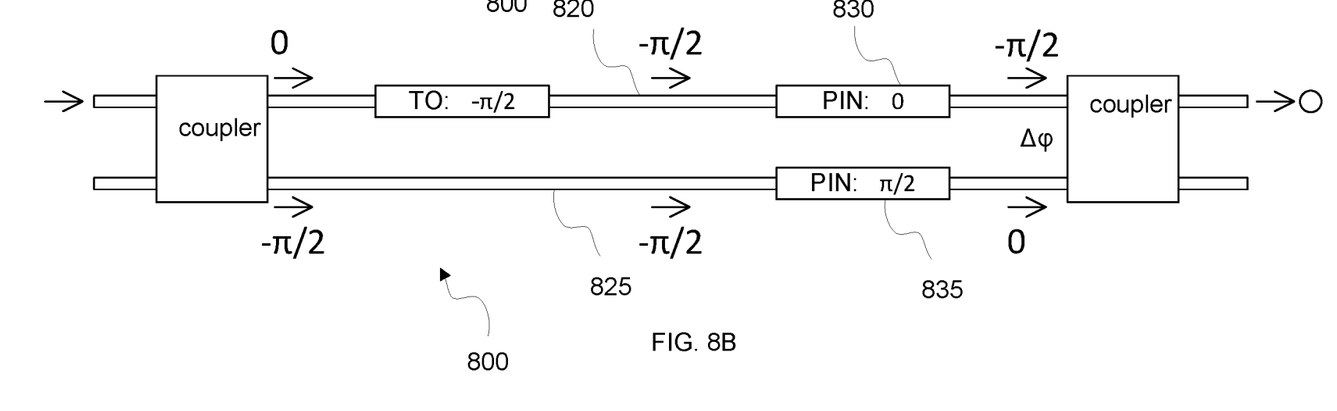
Figure 8C:
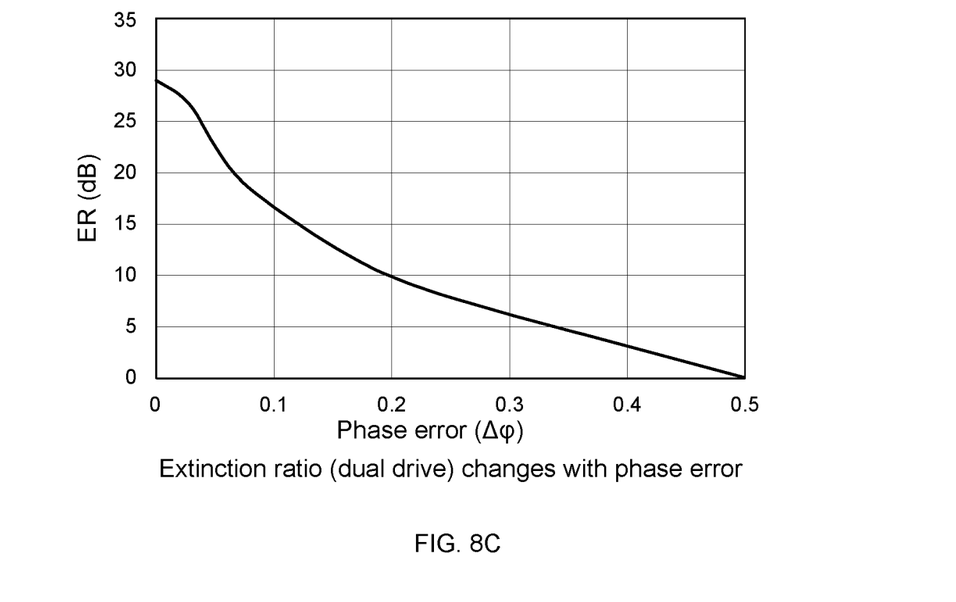
FIG. 8C is a plot of extinction ratio vs. phase error for an example embodiment of a dual-driven Mach-Zehnder 2×2 switch.
Figure 8D:
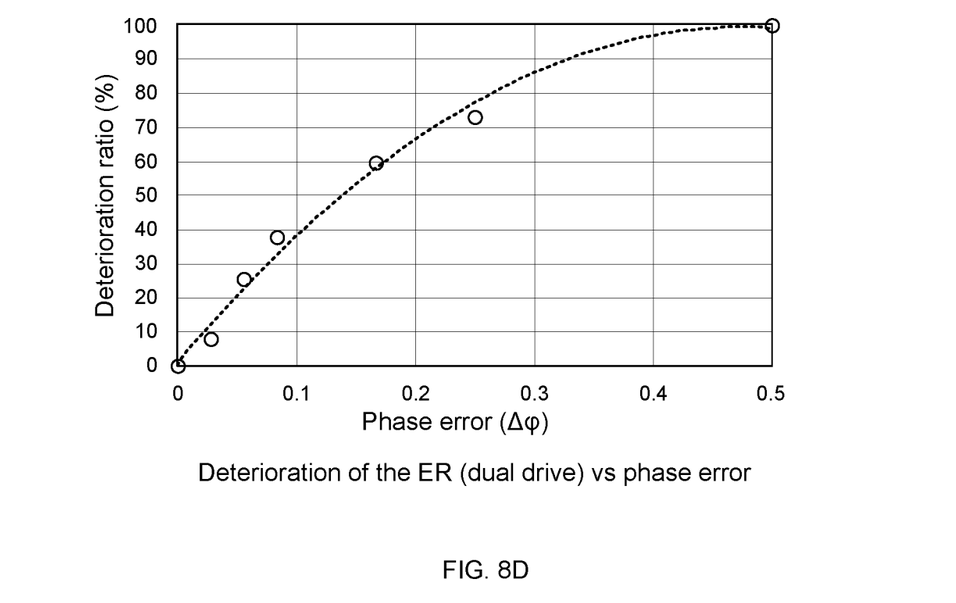
FIG. 8D is a plot of deterioration of the extinction ratio vs. phase error for an example embodiment of a dual-driven Mach-Zehnder 2×2 switch.

FIGS. 8A and 8B illustrate an example of a dual driven optical device 800 in the form of a thermal phase shifter implemented to create a fixed $\pi/2$ phase bias. In this example, the optical device 800 has a first arm 820 including a first carrier modification element 830 and a second first arm 825 including a second carrier modification element 835. Performance of this example was modelled using L=1000 μm, w_p-i-n=2.0 μm, w_si=500 nm and h_slab=90 nm. Based on these inputs simulations were run and results for extinction ratio changes with phase error Δφ, and deterioration of the extinction ratio vs. phase error were calculated and plotted in FIGS. 8C and 8D. As illustrated in this example, as the phase error reaches 0.5, the deterioration ratio converges with 100% deterioration.

In another example, an optical switch employing only an insulator cladding 150 such as silica ($SiO_2$) without the cladding 130, was modelled with L=1000 μm, w_p-i-n=2.0 μm, and the first arm 120 being sufficiently far from the second arm 115 such that self-heating only affects the first arm 120 leading to maximum temperature difference between the first arm 120 and the second arm 115. For an example where the insulator cladding 150 has a $(dn/dT)_i = 2 \times 10^{-4}$ $K^{-1}$. The temperature change required for a π phase shift is $\Delta T_\pi = \lambda/2L \times (dn/dT)^{-1}$ or 3.9K. Accordingly, the phase shift per degree K is $0.26\pi/K$. Results for driving the prior art version of the optical switch at the examples of carrier surface combination velocity (SRV) of an ideal waveguide/cladding interface (SRV=10 cm/s) and a typically real waveguide/cladding interface (SRV=10000 cm/s) are provided below in Table 1.

TABLE 1

| surface recombination* | SRV (cm/s) | Pπ/2 (mw) | ΔT (K) | Phase shift (π) | Contrast ratio without self-heating (dB) | Contrast ratio with self heating (dB) | Δ contrast ratio |
|---|---|---|---|---|---|---|---|
| all surface | 10 | 1 | 0.1 | 0.026 | 29 | 27 | −7% |
|  | 10000 | 4 | 0.4 | 0.1 | 29 | 17 | −41% |

In comparison with the prior art version, the optical interferometer 200 in the form of an optical switch was modelled. The optical switch employing a cladding 130 having a cladding temperature coefficient of refractive index $(dn/dT)_{cl} = -5 \times 10^{-4}$ $K^{-1}$ based on a typical polymer such as silicone (e.g. polysiloxane). This example is taken from scenario c illustrated in FIG. 7. In this case, the effective temperature coefficient of refractive index $(dn/dT)_e$ is about $1 \times 10^{-4} K^{-1}$ for the combination of the cladding with the other first arm structures. Based on this combination, the phase change reduces to about $0.13\pi/K$. Results for driving the optical switch including the cladding 130 at the examples of carrier surface combination velocity (SRV) of ideal waveguide/cladding interface (SRV=10 cm/s) and a typically real waveguide/cladding interface (SRV=10000 cm/s) are provided below in Table 1. These results demonstrate that the implementation of the cladding 130 improves the switch contrast ratio.

TABLE 2

| surface recombination | SRV (cm/s) | Pπ/2 (mw) | ΔT (K) | Phase shift (π) | Contrast ratio without self-heating (dB) | Contrast ratio with self heating (dB) | Δ contrast ratio |
|---|---|---|---|---|---|---|---|
| all surface | 10 | 1 | 0.1 | 0.013 | 29 | 28 | −3% |
|  | 10000 | 4 | 0.4 | 0.05 | 29 | 23 | −20% |

Based on the results indicated in Tables 1 and 2, the selected cladding 130 in this example provides for about a 50% improvement in self-induced switch crosstalk.

By way of example only, and not intended to be limiting, Table 3 illustrates some examples of siloxane polymers and their corresponding refractive index (dn/dT) values. Other suitable cladding materials including other siloxane polymers are considered within the scope of the invention.

| Example | Linear CTE, ppm/K | dn/dT $K^{-1}$ bulk | dn/dT $K^{-1}$ film |
|---|---|---|---|
| Dimethylsiloxane | 325 | $-5 \times 10^{-4}$ | $-3.6 \times 10^{-4}$ |
| Dimethyl-methylphenul-siloxane | 265 | $-4.4 \times 10^{-4}$ | $-3.3 \times 10^{-4}$ |
| Methyl-phenylsiloxane | 250 | $-3.8 \times 10^{-4}$ | $-3.0 \times 10^{-4}$ |
| Phenyl-T resin | 179 | N/A | $-2.1 \times 10^{-4}$ |
| (below and above $T_g$) | 221 |  | $-2.6 \times 10^{-4}$ |

Although the present application describes specific features and embodiments, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope of those claims.

I claim:

1. An optical phase shifter comprising:
    an optical waveguide core;
    a carrier modification element to induce a phase shift in the optical waveguide core, the carrier modification element including a semiconductor junction;
    a cladding disposed on at least a portion of the semiconductor junction and at least a portion of a top surface of the optical waveguide core, the cladding having a temperature coefficient of refractive index $(dn/dT)_{cl}$ opposite in sign to a temperature coefficient of refractive index $(dn/dT)_a$ of the optical waveguide core; and
    one or more insulator claddings proximate to the cladding, at least a portion of the insulator claddings disposed on at least a portion of the doped region of the semiconductor junction.

2. The phase shifter of claim 1, wherein the carrier modification element comprises a carrier injection element.

3. The optical phase shifter of claim 1, wherein the carrier modification element comprises a carrier depletion element.

4. The optical phase shifter of claim 1, wherein an effective temperature coefficient of refractive index $(dn/dT)_e$ for a combination of the cladding and the optical waveguide is about zero.

5. The optical phase shifter of claim 1, wherein an effective temperature coefficient of refractive index $(dn/dT)_e$ for a combination of the cladding and the optical waveguide at least in part relieves a phase error caused by self-heating from operation of the carrier modification element.

6. An optical interferometer comprising:
    a first arm defining a first arm optical path;
    a second arm defining a second arm optical path;
    a beam splitter for splitting an input optical beam into first and second sub-beams for propagating in the first and second arm optical paths, respectively;
    a beam combiner for combining the first and second sub-beams propagated in the first and second arm optical paths, respectively, into an output optical beam;
    the first arm including a waveguide core and a carrier modification element to induce a phase shift in the first arm optical path relative to the second arm optical path, the carrier modification element including a semiconductor junction;
    a cladding disposed on at least a portion of the semiconductor junction and at least a portion of a top surface of the optical waveguide core, the cladding having a temperature coefficient of refractive index $(dn/dT)_{cl}$ opposite in sign to a temperature coefficient of refractive index $(dn/dT)_{a1}$ of the first arm; and one or more insulator claddings proximate to the cladding, at least a portion of the insulator claddings disposed on at least a portion of the doped region of the semiconductor junction.

7. The optical interferometer of claim 6, wherein the semiconductor junction is coupled to the waveguide core.

8. The optical interferometer of claim 7 further comprising an insulating substrate, wherein the waveguide core comprises silicon and is disposed on the insulating substrate, and wherein the cladding is disposed around at least a portion of the waveguide core.

9. The optical interferometer of claim 6, wherein the semiconductor junction comprises a p-i-n junction, and wherein the cladding is proximate to at least a portion of the p-i-n junction.

10. The optical interferometer of claim 6, wherein the cladding comprises a non-semiconductor material.

11. The optical interferometer of claim 10, wherein the non-semiconductor material is a polymer.

12. The optical interferometer of claim 6, wherein the first arm comprises a waveguide core, wherein an effective temperature coefficient of refractive index $(dn/dT)_e$ for a combination of the cladding and the waveguide core is about zero.

13. An optical device comprising the optical interferometer of claim 6, wherein the optical device is selected from the group consisting of:
 a modulator; and,
 an optical switch.

14. The optical interferometer of claim 6, wherein the carrier modification element comprises a carrier injection element.

15. The optical interferometer of claim 6, wherein the carrier modification element comprises a carrier depletion element.

16. The optical interferometer of claim 6, further comprising the cladding proximate to the second arm, the cladding having a temperature coefficient of refractive index $(dn/dT)_{cl}$ opposite in sign to a temperature coefficient of refractive index $(dn/dT)_{a2}$ of the second arm.

17. The optical interferometer of claim 6, wherein an effective temperature coefficient of refractive index $(dn/dT)_e$ for a combination of the cladding and the optical waveguide at least in part relieves a phase error caused by self-heating from operation of the carrier modification element.

* * * * *